United States Patent [19]

Seko

[11] Patent Number: 4,683,040
[45] Date of Patent: * Jul. 28, 1987

[54] PROCESS FOR ELECTROLYSIS OF SODIUM CHLORIDE

[75] Inventor: Maomi Seko, Tokyo, Japan

[73] Assignee: Asahi Kasei Kogyo Kabushiki Kaisha, Osaka, Japan

[*] Notice: The portion of the term of this patent subsequent to Dec. 11, 1996 has been disclaimed.

[21] Appl. No.: 397,783

[22] Filed: Jul. 13, 1982

Related U.S. Application Data

[63] Continuation of Ser. No. 836,417, Sep. 26, 1977, abandoned, which is a continuation-in-part of Ser. No. 745,196, Nov. 26, 1976, abandoned, which is a continuation of Ser. No. 556,288, Mar., 1975, abandoned.

[30] Foreign Application Priority Data

Mar. 7, 1974 [JP] Japan .................................. 49-25718

[51] Int. Cl.$^4$ .............................................. C25B 1/14
[52] U.S. Cl. .................................... 204/98; 204/128; 204/296
[58] Field of Search ......................... 204/98, 128, 996

[56] References Cited

U.S. PATENT DOCUMENTS

| | | | |
|---|---|---|---|
| 3,017,338 | 1/1962 | Butler, Jr. et al. | 204/98 |
| 3,132,123 | 5/1964 | Harris, Jr. et al. | 260/87.5 |
| 3,159,609 | 12/1964 | Harris, Jr. et al. | 260/87.5 |
| 3,163,599 | 12/1964 | Salutsky et al. | 204/128 |
| 3,423,378 | 1/1969 | England | 260/80.8 |
| 3,506,635 | 4/1970 | Anderson | 260/88.3 |
| 3,528,954 | 9/1970 | Carlson | 260/87.5 |
| 3,546,186 | 12/1970 | Gladding et al. | 260/80.73 |
| 3,773,634 | 11/1973 | Stacey et al. | 204/98 |
| 3,793,163 | 2/1974 | Dotson | 204/98 |
| 3,839,172 | 10/1974 | Chapiro et al. | 204/159.17 |
| 4,040,919 | 8/1977 | Eng | 204/128 |
| 4,060,465 | 11/1977 | Yokota et al. | 204/128 |
| 4,065,366 | 12/1977 | Oda et al. | 204/98 |
| 4,178,218 | 12/1979 | Seko | 204/296 |
| 4,200,711 | 4/1980 | Onoue et al. | 525/387 |
| 4,202,743 | 5/1980 | Oda et al. | 204/98 |
| 4,224,121 | 9/1980 | Dempsey et al. | 204/98 |

FOREIGN PATENT DOCUMENTS

| | | | |
|---|---|---|---|
| 48-14572 | 6/1973 | Japan | 204/98 |
| 2091116 | 7/1982 | United Kingdom | 204/296 |

OTHER PUBLICATIONS

Chem. Abstracts, vol. 79, 1973, 147837t.
Chem. Abstracts, vol. 85, 1976, 168892w.
"Present Status of Ion Exchange Membrane Chlor-Alkali Cells", pp. 58-70, (1973).
"Technology Forum of Soda Industries", (1977), pp. 49-52.
"Rogers' Industrial Chemistry", edited by C. C. Furnas, 6th Ed., vol. one, D. Van Nostrand Co., Inc. N.Y., pp. 362-363 & 438-439/(1942).
"Sodium Chloride, The Production and Properties of Salt and Brine", edited by Dale W. Kaufmann, American Chemical Society Monograph Series, Reinhold Publishing Corp., New York, p. 200, (1960).
Analytical Chemistry, vol. 7, pp. 565-568, (1958).

Primary Examiner—Richard L. Andrews
Attorney, Agent, or Firm—Birch, Stewart, Kolasch & Birch

[57] ABSTRACT

A process for the electrolysis of aqueous solutions of sodium chloride in an electrolytic cell separated into an anode chamber and a cathode chamber by a perfluorocarbon copolymer cation exchange membrane having pendant carboxylic acid groups. The process is characterized by reducing the calcium content of the aqueous sodium chloride solution charged into the anode chamber to less than 1 p.p.m. High current efficiencies are obtained utilizing membranes having an ion exchange capacity of carboxylic acid groups of from 0.5 to 2.1 milliequivalents per gram of dry resin.

18 Claims, No Drawings

PROCESS FOR ELECTROLYSIS OF SODIUM CHLORIDE

RELATED APPLICATIONS

This application is a continuation of copending application Serial No. 836,417, filed on Sept. 26, 1977, now abandoned, which is a continuation-in-part of application Serial No. 745,196, filed on Nov. 26, 1976, now abandoned, which is, in turn, a continuation of application Ser. No. 556,288, filed on Mar. 7, 1975, now abandoned. Application Ser. No. 959,312, a divisional of said application Ser. No. 836,417, issued as U.S. Pat. No. 4,178,218 on Dec. 11, 1979. This case is also related to application Ser. No. 214,876, filed on Dec. 10, 1980, (now U.S. Pat. No. 4,357,218, a divisional of Ser. No. 836,417.

BACKGROUND OF THE INVENTION

A large proportion of chlorine and caustic produced throughout the world is manufactured in diaphragm type electrolytic cells wherein the opposed anode and cathode are separated by a fluid permeable diaphragm which may be of asbestos, a polymer film or a polymer film supported on asbestos. The diaphragm defines separate anolyte and catholyte compartments. Chlorine is produced in the former, aqueous sodium hydroxide in the latter.

In operation, brine, preferably saturated, is fed to the anolyte compartment. The brine passes through the diaphragm into the catholyte compartment where an aqueous sodium hydroxide solution of about 11 to 18 percent is produced. This solution is contaminated by sodium chloride which must be separated. After separation, the caustic solution is concentrated to produce the commercial product.

The permionic exchange membrane type electrolytic cell has been utilized as an improvement over the diaphragm type. The permionic membrane replaces the diaphragm, and is characteristically different from it since, in contrast to the diaphragm, it is substantially impervious to water and to sodium chloride. The exchange membrane selected for the production of chlorine and caustic is usually a cation exchange membrane which permits the passage of sodium ions into the catholyte, but prevents back-migration of OH ions into the anolyte. As a result, relatively pure caustic substantially free of sodium chloride is produced in the catholyte, and high grade chlorine is produced at the anode.

A number of cation exchange membranes are known.

U.S. Pat. Nos. 3,887,499 and 3,657,104 describe permselective cation exchange membranes comprising a hydrocarbon polymer backbone with pendant carboxylic and sulfonic groups.

U.S. Pat. No. 3,878,072 describes cation exchange membranes which are hydrolyzed copolymers of a perfluorinated hydrocarbon and either a fluorosulfonated perfluorovinyl ether or a sulfostyrenated perfluorinated ethylene propylene polymer. In either event, the characteristic feature of the membrane is the sulfonyl group as the only functional group.

U.S. Pat. No. 3,853,721 which issued on Dec. 10, 1974 describes asbestos diaphragms containing from about 0.01 to 22 weight percent, based on the weight of the diaphragm, of an ion exchange resin which is a fluorocarbon polymer characterized by the presence of the following groups:

| | |
|---|---|
| sulfonic | $SO_3H$ |
| fluoromethylene sulfonic | $CF_2SO_3H$ |
| benzene sulfonic | $\phi SO_3H$ |
| chloromethylene sulfonic | $CCl_2SO_3H$ |
| carboxylic | COOH |
| phosphoric | $PO_3H_2$ |
| phosphorous | $PO_2H_2$ |
| phenolic | $\phi OH$ |

A characteristic feature of these diaphragms is that they are gas and electrolyte permeable in contrast to permionic membranes, such as the cationic ion exchange membranes of this invention which are substantially impermeable to electrolytes, but permit the passage of ions. Another feature, according to the patent, is that they have a resistance voltage drop across the diaphragm of as much as 0.2 to 0.3 volt less than an untreated asbestos diaphragm of the same thickness.

A problem with the use of diaphragm electrolysis, as pointed out above, is that the permeability of the diaphragm to sodium chloride results in accumulation of this material in the catholyte. This concentration may be as high as 17%. When attempts are made to produce concentrated solutions of sodium hydroxide in the catholyte by evaporation of water, it is necessary to use an expensive apparatus as well as a large amount of energy.

U.S. Pat. No. 3,301,893 discloses certain fluorocarbon ethers containing both carboxyl and sulfonyl groups. The products of this patent, however, are of such low molecular weight that they cannot be utilized for the preparation of cation exchange membranes.

THE INVENTION

It has now been discovered that many of the difficulties of the prior art can be minimized or completely avoided by the utilization of permselective cationic ion exchange membranes in which carboxylic acid groups or both carboxylic and sulfonic acid groups are pendant from a fluorocarbon polymer.

Membranes of this type manifest a number of significant advantages. Those characterized by the presence of carboxyl groups manifest:

1. Decreased back-migration of hydroxyl ions.
2. Increased current efficiency at high current density even when the concentration of sodium hydroxide in the catholyte is high.
3. Increased purity of the sodium hydroxide solution produced in the cathode because of the resistance of the membrane to permeation by sodium chloride.
4. Increased purity of chlorine produced at the anode.
5. Resistance to oxidation.

Those membranes which have both carboxylic and sulfonic groups are much preferred embodiments of this invention. They exhibit all of the above advantages and, in addition:

1 Their useful life in operation is surprisingly long.
2. Power consumption in units in which they are employed is surprisingly low.

The membranes of this invention are prepared from fluorocarbon polymers with pendant carboxylic acid groups, or pendant carboxylic acid and sulfonic acid groups. The pendant groups may be chemically bonded to the fluorocarbon polymer. Alternatively, they may become integral with the polymer by impregnation and coating techniques followed by polymerization as described more fully hereinafter. Since membranes prepared by both procedures are functional equivalents, they will be described in the specification and claims as fluorocarbon polymer membranes having pendant carboxyl groups, or pendant carboxyl and sulfonic groups. Often the polymers will be crosslinked to increase resistance to solvent and temperature under electrolysis conditions. Many linear polymers, however, are completely satisfactory. For example, a crosslinking agent such as divinyl benzene may be added to a monomer mixture used to impregnate or coat a fluorocarbon membrane. Upon completion of polymerization, the dimensional stability of the membrane may be greatly improved.

As mentioned above, the carboxylic acid groups may be bonded chemically to the fluorocarbon polymer. Alternatively, a polymer having carboxylic acid groups may be combined physically with the fluorocarbon polymer. In the latter case, the polymer having carboxylic acid groups may be dispersed uniformly throughout the fluorocarbon matrix or it may be present in layers on the fluorocarbon polymer. Such products may be prepared by coating or impregnating a fluorocarbon polymer membrane which may or may not have sulfonic acid groups with a carboxylic acid groupcontaining monomer and, thereafter, effecting polymerization.

As mentioned above, when both sulfonic acid and carboxylic acid groups are present on the membrane, it will have high electric conductivity, with a resulting decrease in power cost and increasing commercial advantages. The advantages are especially apparent when the ratio of carboxylic acid groups to sulfonic acid groups is from 1 : 100 to 100 : 1.

When practicing this invention, the acid groups may be either in the form of free acid or metal salts.

The cation exchange membrane of this invention wherein the acid groups are directly attached to the base fluorocarbon polymer may be prepared as follows:

1. A membrane made from a polymer produced by polymerizing a vinyl ether of the general formula:

$CF_2=CF-O-(CF_2)_n-X$ (wherein n is an integer of 2 to 12, preferably 2 to 4; and X is —CN, —COF, —COOH, —COOR, —COOM or —CONR$_2$R$_3$, where R is an alkyl group containing 1 to 10, preferably 1 to 3, carbon atoms; R$_2$ and R$_3$ are individually hydrogen or one of the groups represented by R; and M is sodium, potassium or cesium) with tetrafluoroethylene and/or $CF_2=CF-O-R_f$ (wherein R$_f$ is a perfluorinated alkyl group containing 1 to 3 carbon atoms), and hydrolyzing the polymer where necessary to form acid groups;

2. A polymer membrane made by polymerizing a perfluoroacrylic monomer represented by the general formula:

$CF_2=CFCOZ$ (wherein Z is fluorine or an alkoxy group containing 1 to 10, preferably 1 to 3 carbon atoms, amino or a hydroxy group) with tetrafluoroethylene and $CF_2=CF-O-R_f$ and hydrolyzing where necessary to form acid groups; and 3. a membrane made by polymerizing a perfluorocarbon vinyl ether of the general formula:

$CF_2=CF-O-(CF_2)_n-X$, a perfluorocarbon sulfonyl fluoride of the general formula:

$FSO_2CFR_gCF_2O(CFYCF_2O)_mCF=CF_2$ (wherein R$_g$ is fluorine or a perfluoroalkyl group having 1 to 10 carbon atoms; Y is fluorine or a trifluoromethyl group; and m is an integer of 1 to 3) with tetrafluoroethylene and/or $CF_2=CF-O-R_f$, and hydrolyzing where necessary to form acid groups.

Cation exchange membranes of the invention in which the pendant acid groups are physically combined with the base are prepared as follows:

4. A membrane of fluorocarbon polymer, e.g. a homo or copolymer of such monomers as tetrafluoroethylene, hexafluoropropylene or perfluoromethyl perfluorovinyl ether is coated or impregnated with $CF_2=CF-O-(CF_2)_n-X$, wherein X has the same meaning as in (1) above, polymerizing and, if necessary, hydrolyzing to form the acid;

5. A copolymer membrane made from a perfluorovinyl ether derived monomer which has an LSO$_2$ group convertible to sulfonic acid of the general formula:

$LSO_2CFR_gCF_2O(CFYCF_2O)_mCF=CF_2$ (wherein L is OH, fluorine or OA, where A is a quaternary ammonium radical), tetrafluoroethylene and $CF_2=CF-O-R_f$ is impregnated or coated with $CF_2=CF-O-(CF_2)_n-X$, followed by polymerization, and, if necessary, hydrolysis to form the acid;

6. A membrane made from a perfluorovinyl ether derived monomer having a group convertible to a sulfonic acid group and having the general formula $LSO_2CFR_gCF_2O(CFYCF_2O)_mCF=CF_2$, as in (5) above, is impregnated or coated with perfluoroacrylic acid or perfluorocarbonyl fluoride, followed by polymerization, and, if necessary, hydrolysis to form the acid;

7. A fluorocarbon polymer membrane having no ion exchange group is impregnated or coated with a vinyl compound having a COOR group, wherein R is alkyl containing from 1 to 10 carbon atoms, followed by polymerization, and, if necessary, hydrolysis to form the acid; and 8. A membrane made from a perfluorovinyl ether derived monomer of the general formula $LSO_2CFR_gCF_2O(CFYCF_2O)_mCF=CF_2$ as in (5) above, is impregnated or coated with a vinyl compound having a COOR group, as in (7) above, followed by polymerization, and, if necessary, hydrolysis to form the acid.

Among the polymers mentioned in the above, copolymers comprising $CF_2=CF-OR_f$ and $CF_2=CF-O-(CF_2)_n-X$ or $CF_2=CF-COZ$ and the copolymer comprising $CF_2=CF-OR_f$, $CF_2=CF_2$ and $CF_2=CF-O-(CF_2)_n-X$ or $CF_2=CF-COZ$ are preferred because of the ease with which they can be formed into membranes.

When the monomers are impregnated into or coated on the polymer in the preparation of the above membranes, the polymerization may be effected in the presence of a crosslinking agent or a solvent, if desired.

Typical examples of the fluorinated perfluorovinyl ether of the general formula:

$$CF_2=CF-O-(CF_2)_n-X$$

are methyl perfluoro-6-oxa-7-octenoate, methyl perfluoro-5-oxa-6-heptenoate, perfluoro-6-oxa-7-octenoyl fluoride and perfluoro-6-oxa-7-octenenitrile.

Typical examples of an $LSO_2$ group containing perfluorovinyl ether derivative of the general formula:

$LSO_2CFR_gCF_2O(CFYCF_2O)_mCF=CF_2$ are the triethylammonium salts of perfluoro[2-(2-fluorosulfonylethoxy)-propylvinyl ether]such as $(C_2H_5)_3HN-O-SO_2CF_2CF_2OCF(CF_3)-CF_2OCF=CF_2$.

Typical examples of the vinyl ether of the general formula:

$$CF_2=CFOR_f$$

are perfluoromethyl perfluorovinyl ethers.

Typical examples of the perfluorocarbon polymer free from COOR groups are homopolymers of tetrafluoroethylene, hexafluoropropene, vinylidene fluoride, perfluoromethyl perfluorovinyl ether, chlorotrifluoroethylene, 1,1,3,3,3-pentafluoropropene and 1,2,3,3,3-pentafluoropropene, alternating copolymers of these monomers and copolymers of these monomers with ethylene.

As crosslinking agents, there may be used fluorinated diolefins of the general formula:

$$CF_2=CF-O-(CF_2CF_2-O)_nCF=CF_2,$$

in addition to such diolefin compounds as, for example, divinylbenzene and butadiene. When a membrane made from a fluorocarbon polymer with pendant sulfonic groups is coated or impregnated with a monomer such as acrylic acid and polymerized in the presence of divinylbenzene, the resulting cation exchange membrane is greatly improved in dimensional stability.

As is clear from the above explanation, the cation exchange membranes of this invention can be prepared by a variety of methods utilizing many different monomers. They may be homopolymers or copolymers, including more than two monomeric units. As is standard in the art, fluorocarbon refers to fluorine containing monomers which may contain hydrogen, chlorine or other atoms attached to carbon atoms, e.g. chlorotrifluoroethylene and vinylidene fluoride. Perfluorocarbons are monomers in which the hydrogens are all replaced with fluorine. For stability, the latter are preferred.

Standard polymerization procedures including solution, emulsion and suspension polymerization may be employed. Polymerization may be initiated by free radical mechanisms or other procedures. The resulting polymer is molded into a membrane according to an ordinary molding procedure such as melt fabrication or the like. The cation exchange membranes may often be prepared directly by casting polymerization techniques. When a fluorocarbon polymer having ion exchange groups is impregnated or coated with acrylic acid or the like monomer having carboxylic groups, and, if desired, with a crosslinking agent and then polymerized, the polymerization may be in the presence of a free radical polymerization catalyst such as a peroxide, by the action of high energy ionizing radiation, or by other means.

Generally, the cation exchange membranes used in this invention will have an exchange capacity, in terms of carboxylic acid groups, of 0.1 to 10 milliequivalents, preferably 0.5 to 4.0 milliequivalents, per gram of dry resin. When sulfonic acid groups are also present in the membranes, the exchange capacity of the sulfonic acid groups is 0.1 to 10 milliequivalents, preferably 0.5 to 4.0 milliequivalents, per gram of dry resin.

The cation exchange membrane used in the present invention may sometimes be reinforced in mechanical strength by incorporating into the membrane a net of fibers of other fluorocarbon polymer. For industrial purposes, the use of a cation exchange membrane, which has been linked with Teflon fibers, is preferable, in general. The thickness of the membrane is 0.01 to 1.5 mm, preferably 0.05 to 1.5 mm, and may be suitably selected so that the specific conductivity and current efficiency of the membrane is such that it may be successfully employed in the electrolysis of sodium chloride in the selected electrolytic cell.

The cation exchange membrane of this invention contain 5 to 50%, based on their own weight, of water in the sodium salt form membrane. The membranes are utilized to divide the electrolytic cell employed into a cathode chamber and an anode chamber. Electrolysis is performed by charging the anode chamber with an aqueous sodium chloride solution, while adding to the cathode chamber water, or a dilute sodium hydroxide solution, which may be recycled to control the concentration of sodium hydroxide at the outlet of the cathode chamber. The concentration of the sodium chloride solution charged to the anode chamber is normally high, preferably near saturation.

The electrolysis may be effected at a temperature of 0° to 150° C., and heat generated due to the electrolysis is removed by cooling a part of the anolyte or catholyte.

In the cathode and anode chambers, there are generated hydrogen and chlorine, respectively. To prevent the membrane from contacting either electrode, a spacer may be interposed between the two. The separation of the gases from the liquids is desirably conducted by providing a free space at the upper portion of each chamber of the electrolytic cell. In this case, it is sometimes desirable that the gases and the effluents be discharged separately, though discharging them together may be effected in the cathode or anode chambers. When separation of gas from liquid is effected in the upper free space within the electrolytic cell, the recycle of the electrolyte in each chamber can advantageously be promoted by the ascending action of the formed gases, in general. This is particularly apparent where the electrolytic cell has been so designed that the formed gases are introduced at the back side of each electrode and are ascending so that the space between the electrode and the membrane surface is gas free. Amongst the advantages of this design are decreased potential depression and lower power consumption.

The perpass electrolysis ratio of sodium chloride charged to the anode chamber may be 3 to 50%. This varies depending on the current density and the manner of heat removal, but is normally maintained as high as possible.

The liquid in each chamber is desirably stirred by means of the gases generated in the cathode and anode chambers, in addition to the flow of externally supplied fluids. For this purpose also, it is desirable that an electrode having many vacant spaces such as a metal mesh electrode is used so that the liquid in each chamber can be moved, circulated and stirred with ascending flow of the gases.

As the cathode, the use of an iron electrode which has been plated with nickel or a nickel compound is preferable, in general, from the standpoint of overpotential. As the anode, the use of a metal mesh or rod electrode which has been coated with an oxide of a noble metal such as ruthenium or the like is preferred. Use of these types of electrodes makes it possible to minimize the interval between membranes and electrodes so that power consumption and potential depression during electrolysis are minimized. By the use of the membranes, back-migration of OH ions is inhibited and the cathode and anode chambers are distinctly separated from each other. Accordingly, when metal electrodes high in mechanical dimensional precision are used in combination with the cation exchange membrane of this invention, the interval between each electrode and the membrane can be made extremely small, e.g. about 1 to 3 mm, so that electrolysis can be effected at a high current density while minimizing the potential depression and while maintaining low power consumption. These characteristics are not observed in the conventional diaphragm process.

Cation exchange membranes of this invention are resistant to chlorine generated in the anode chamber, so that the electrolysis operation can be carried out stably over a long period of time. Additionally, as indicated above, back-migration of hydroxyl ions is inhibited. As a result, the pH of the liquid in the anode chamber can be easily maintained at from neutral to slightly acidic, and thus the content of oxygen in the chlorine generated in the anode chamber can be maintained as low as less than 500 p.p.m.

By utilizing the cation exchange membranes of the invention, current efficiency is far higher than can be achieved with cation exchange membranes prepared from perfluorocarbon polymers with sulfonic acid groups as the only ion exchange groups. The production, in the cathode chamber, of sodium hydroxide at a concentration of more than 20% can be effected with a current efficiency of at least 80%, and about 90 to 98% under optimum conditions. Since the current efficiency is high and the power consumption low, cells using membranes of this invention can be operated economically at current densities as high as 20 to 70 A/dm$^2$. A principal reason contributing to the high current efficiency is the inhibition of back-migration of OH ions.

The aqueous sodium chloride solution charged to the anode chamber is purified, as in conventional sodium chloride electrolysis processes. It may be subjected to the dechlorination, dissolution and saturation of sodium chloride, precipitation and separation of magnesium, calcium, iron, etc., and neutralization, as in other procedures. It may also be desirable to further purify the feed sodium chloride solution with a granular ion exchange resin, particularly a chelate resin, to reduce the calcium content thereof to an acceptable limit, preferably to less than 1 p.p.m.

While this invention should not be limited by theory, it appears possible that the advantages of this invention are attained because of the low dissociation constant of carboxylic acid groups. As a result of the low dissociation constant, the carboxyl groups in the membrane in contact with the anolyte having a high hydrogen ion concentration exist in the hydrogen form, which makes the membrane structure more compact and effectively inhibits the back-migration of hydroxyl ions. This effect cannot be achieved with membranes in which the only pendant groups are sulfonic acid groups.

The following non-limiting examples are given by way of illustration only.

EXAMPLE 1

A polymer prepared by the copolymerization of methyl perfluoro-6-oxa-7-octenoate, perfluoromethyl perfluorovinyl ether and tetrafluoroethylene is compression molded to form a membrane 0.12 mm in thickness.

This membrane is hydrolyzed to obtain a carboxylic acid type cation exchange resin membrane having an exchange capacity of 2.1 milliequivalents per gram of dry resin.

This cation exchange membrane, which has an effective area of 100 dm$^2$, is used to divide an electrolytic cell into a cathode chamber and an anode chamber. Fifty units of such electrolytic cell are arranged in series so that the respective adjacent electrodes form a bipolar system comprising 50 electrolytic cells.

Using the thus prepared electrolytic cell assembly, electrolysis is conducted by charging 305 g/l of an aqueous sodium chloride solution to each cell through the inlet of the anode chamber, and an aqueous sodium hydroxide solution is recycled while being controlled at a concentration of 38% by adding water to the outlet of the cathode chamber. The electrolysis is carried out while applying a current of 5,000 amperes to the chambers in series. The current efficiency is 91.6%.

COMPARISON EXAMPLE 1

A copolymer of perfluoro[2-(2-fluorosulfonylethoxy)propylvinyl ether] with tetrafluoroethylene is molded into a membrane 0.12 mm in thickness, which is then hydrolyzed to prepare a cation exchange membrane containing 0.90 milliequivalent per gram of dry resin of sulfonic acid groups.

This membrane is utilized in the same manner as in Example 1, but the current efficiency while producing sodium hydroxide of 35.1% concentration is only 55.7%, and the amount of NaCl in the NaOH is 2,000 p.p.m. Further, the specific electric conductivity of the membrane is 11.3 mmho/cm as measured in a 0.1N aqueous NaOH solution at 25° C.

The specific electric conductivity of the membrane is measured in the following manner.

The membrane is completely brought into the —SO$_3$Na form and then equilibrated by dipping at normal temperature for 10 hours in 0.1N aqueous NaOH solution which is supplied continuously. Subsequently, the electric resistivity of the membrane is measured in the solution by applying an alternating current of 1,000 cycles, while maintaining the solution at 25° C., and the specific electric conductivity is calculated from the thickness and the effective area of the membrane.

COMPARISON EXAMPLE 2

The same copolymer as in Comparison Example 1 is molded into a membrane 0.12 mm in thickness, and then hydrolyzed to prepare a cation exchange membrane containing 0.65 milliequivalent per gram of dry resin of sulfonic acid groups.

Using this membrane, electrolysis is conducted in the same manner as in Example 1, but the current efficiency while producing sodium hydroxide of 35.1% concentration is only 73%. The specific electric conductivity of the membrane is 4.5 mmho/cm as measured in a 0.1N aqueous NaOH solution at 25° C.

EXAMPLE 2

A ternary copolymer comprising methyl perfluoroacrylate, tetrafluoroethylene and perfluoropropyl perfluorovinyl ether is molded into a membrane of 0.12 mm in thickness, which is then hydrolyzed to prepare a cation exchange resin membrane containing 1.15 milliequivalents per gram of dry resin of carboxylic acid groups.

Using 50 sheets of this cation exchange membrane which has an effective area of 100 dm$^2$, electrolysis is conducted in the same manner and by use of the same apparatus as in Example 1, while applying a current of 5,000 amperes in series to the 50 units of electrolytic cells. The current efficiency for producing sodium hydroxide of 31.7% concentration is 97.2%.

EXAMPLE 3

A copolymer of $CF_2=CF-O(CF_2)_4COONa$ with tetrafluoroethylene is molded into a membrane of 0.12 mm in thickness to prepare a cation exchange membrane containing 1.33 milliequivalents per gram of dry resin of carboxylic acid groups. Using this cation exchange membrane, electrolysis is conducted in the same manner as in Example 1. The current efficiency for producing sodium hydroxide of 35.8% concentration is 92.9%.

EXAMPLE 4

A ternary copolymer comprising perfluoromethyl perfluorovinyl ether, tetrafluoroethylene and perfluoro-5-oxa-6-heptenoyl fluoride is molded into a membrane of 0.12 mm in thickness, which is then hydrolyzed to prepare a cation exchange membrane containing 1.36 milliequivalents per gram of dry resin of carboxylic acid groups.

Using this cation exchange membrane, electrolysis is conducted in the same manner as in Example 1. The current efficiency for producing sodium hydroxide of 35.5% concentration is 93.3%, and the specific electric conductivity of the membrane is 7.2 mmho/cm.

EXAMPLE 5

A copolymer of perfluoroacrylic acid with tetrafluoroethylene is molded into a membrane of 0.12 mm in thickness. This membrane contains 1.88 milliequivalents per gram of dry resin of carboxylic acid groups.

Using this membrane, electrolysis is conducted in the same manner as in Example 1. The current efficiency for producing sodium hydroxide of 32.5% concentration is 93.6%.

What is claimed is:

1. A process for the electrolysis of an aqueous sodium chloride solution which comprises passing an electric current through said solution in an electrolytic cell separated into an anode chamber and a cathode chamber by a perfluorocarbon cation exchange membrane, while charging an aqueous sodium chloride solution which has been purified to a calcium content of less than 1 p.p.m. into the anode chamber, said membrane comprising a perfluorocarbon copolymer having pendant carboxylic acid groups, said membrane having an ion exchange capacity of carboxylic acid groups of from 0.5 to 2.1 milliequivalents per gram of dry resin.

2. The process of claim 1, wherein the aqueous sodium chloride solution charged into the anode chamber is purified by ion exchange.

3. The process of claim 2, wherein the aqueous sodium chloride solution is purified by using a chelate ion exchange resin.

4. The process of claim 1, wherein the electrolysis is conducted at a temperature of 0° to 150° C. while charging an aqueous sodium chloride solution into the anode chamber and adding water or an aqueous dilute sodium hydroxide solution into the cathode chamber to adjust the concentration of sodium hydroxide to more than 20%.

5. The process of claim 1, wherein the membrane in the sodium salt form has a water content of from 5 to 50% by weight.

6. The process of claim 1, wherein a perfluorocarbon copolymer having pendant carboxylic acid groups is present on the surface of the membrane.

7. The process of claim 1, wherein a perfluorocarbon copolymer having pendant carboxylic acid groups is present on one surface of the membrane.

8. The process of claim 1, wherein the membrane is fiber reinforced.

9. The process of claim 1, wherein the thickness of the membrane is 0.05 to 1.5 mm.

10. The process of claim 1, wherein said perfluorocarbon copolymer is a copolymer of at least one of tetrafluoroethylene and $CF_2=CF-O-R_f$ wherein $R_f$ is a perfluorinated alkyl group containing 1 to 3 carbon atoms with perfluorocarbon vinyl monomers containing carboxylic acid groups or functional groups which can be converted to carboxylic acid groups.

11. The process of claim 1, wherein said perfluorocarbon copolymer is a copolymer of a perfluorocarbon vinyl monomer having the general formula:

$$CF_2=CF-O-(CF_2)_n-X$$

wherein n is an integer of 2 to 12, and X is CN, COF, COOH, COOR, COOM or $CONR_2R_3$, where R is an alkyl group containing 1 to 10 carbon atoms, $R_2$ and $R_3$ are individually hydrogen or an alkyl group containing 1 to 10 carbon atoms, and M is sodium, potassium or cesium, with at least one of tetrafluoroethylene and $CF_2=CF-O-R_f$ wherein $R_f$ is a perfluorinated alkyl group containing 1 to 3 carbon atoms, which copolymer is hydrolyzed, if necessary, to form said acid groups.

12. The process of claim 11, wherein said perfluorocarbon vinyl monomer is selected from the group consisting of compounds having the general formula:

$$CF_2=CF-O-(CF_2)_n-X$$

wherein n is an integer of 2 to 4, and X is CN, COF, COOH, COOR, COOM or $CONR_2R_3$, where R is an alkyl group containing 1 to 10 carbon atoms, $R_2$ and $R_3$ are individually hydrogen or one of the groups represented by R, and M is sodium, potassium or cesium.

13. The process of claim 1, wherein said perfluorocarbon copolymer is a copolymer of a perfluoroacrylic acid having the general formula:

$$CF_2=CF-COZ$$

wherein Z is fluorine, an alkoxy group containing 1 to 10 carbon atoms, amino or hydroxy, with at least one of tetrafluoroethylene and $CF_2=CF-O-R_f$ wherein $R_f$ is a perfluorinated alkyl group containing 1 to 3 carbon atoms, which copolymer is hydrolyzed, if necessary, to form said acid groups.

14. The process of claim 1, wherein said perfluorocarbon copolymer is a copolymer of tetrafluoroethylene and a perfluorocarbon vinyl monomer having the general formula:

$$CF_2=CF-O-(CF_2)_3-X$$

wherein X is CN, COF, COOH, COOR, COOM or $CONR_2R_3$, where R is an alkyl group containing 1 to 10 carbon atoms, $R_2$ and $R_3$ are individually hydrogen or an alkyl group containing 1 to 10 carbon atoms, and M is sodium, potassium or cesium, which copolymer is hydrolyzed, if necessary, to form said acid groups.

15. The process of claim 1, wherein the membrane consists essentially of a combination of a perfluorocarbon copolymer having pendant carboxylic acid groups with another perfluorocarbon polymer having pendant carboxylic acid groups.

16. The process of claim 15, wherein said membrane further includes perfluorocarbon polymer having no ion exchange groups.

17. The process of claim 1, wherein the membrane consists essentially of a combination of a perfluorocarbon copolymer having pendant carboxylic acid groups with perfluorocarbon polymer having no ion exchange groups.

18. The process of claim 4, wherein electrolysis is effected with a current efficiency of greater than 90%.

* * * * *